United States Patent [19]

Tamaru et al.

[11] Patent Number: 4,877,859

[45] Date of Patent: Oct. 31, 1989

[54] FLUORINE-CONTAINING NOVOLAK RESIN AND DERIVATIVE THEREOF

[75] Inventors: Sinji Tamaru, Suita; Motonobu Kubo, Toyonaka; Masato Kashiwagi, Settsu, all of Japan

[73] Assignee: Daikin Industries, Ltd., Osaka, Japan

[21] Appl. No.: 171,126

[22] Filed: Mar. 21, 1988

[30] Foreign Application Priority Data

Mar. 24, 1987 [JP] Japan ................................. 62-69394
Apr. 30, 1987 [JP] Japan ................................. 62-108269

[51] Int. Cl.$^4$ ..................... C08G 14/02; C08G 8/04
[52] U.S. Cl. ................................. 528/129; 528/151; 528/153; 528/158; 528/159; 528/244; 528/247; 525/500; 525/501; 525/502; 525/503; 525/507
[58] Field of Search ............... 528/129, 151, 153, 158, 528/159, 244, 247; 525/500, 501, 502, 503, 507

[56] References Cited

U.S. PATENT DOCUMENTS 3,658,758  4/1972  Eglin et al. ........................... 528/143
3,984,377 10/1976  Hutchinson ........................ 525/502
4,754,003  6/1988  Monnier et al. .................... 525/490

*Primary Examiner*—John Kight
*Assistant Examiner*—Samuel A. Acquah
*Attorney, Agent, or Firm*—Armstrong, Nikaido, Marmelstein, Kubovcik & Murray

[57] ABSTRACT

The present invention provides a fluroine-containing novolak resin or its derivative having a repeating unit of the formula

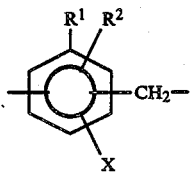

wherein $R^1$ is hydrogen atom, OH or

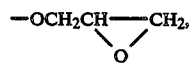

$R^2$ is hydrogen atom or alkyl group having 1 to 4 carbon atoms, X is fluorine-containing monovalent organic group having 2 to 20 carbon atoms.

The present invention also provides a perfluoroalkenyloxphenol or its derivative of the formula

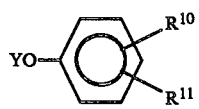

wherein $R^{10}$ is OH or

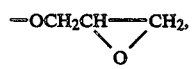

$R^{11}$ is H, OH, alkyl group having 1 to 4 carbon atoms or

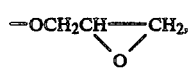

Y is perfluoroalkenyl group having 6 to 14 carbon atoms.

13 Claims, No Drawings

FLUORINE-CONTAINING NOVOLAK RESIN AND DERIVATIVE THEREOF

The present invention relates to a fluorine-containing novolak resin and its derivative. Further, the present invention relates to a perfluoroalkenyloxyphenol and its derivative, which are one of the starting materials of the above fluorine-containing novolak resin and its derivative.

Conventional novolak resin and novolak epoxy resin which contain no fluorine, are used as a packaging material for semiconductor element, resin for preparing a printed circuit board, various electrically insulating material, adhesive, etc. As a fluorine-containing novolak resin, U.S. Pat. No. 3,658,758 discloses a phenol novolak resin which is prepared from fluorine-containing phenol such as trifluoromethylphenol. However, these resins are insufficient in resistance to water and heat.

An object of the invention is to provide a fluorine-containing novolak resin and its derivative which are excellent in resistance in water and heat.

Another object of the invention is to provide a fluorine-containing phenol and its derivative which are useful as a starting material for the fluorine-containing phenol novolak resin or fluorine-containing epoxy resin having excellent resistance to water and heat.

The above and other objects of the invention will become apparent from the following description.

The present invention provides a fluorine-containing novolak resin and its derivative having a repeating unit of the formula

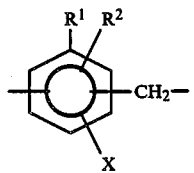
(1)

wherein $R^1$ is hydrogen atom, OH or

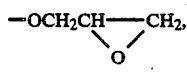

$R^2$ is hydrogen atom or alkyl group having 1 to 4 carbon atoms, X is fluorine-containing monovalent organic group having 2 to 20 carbon atoms.

The present invention also provides a perfluoroalkenyloxyphenol and its derivative of the formula

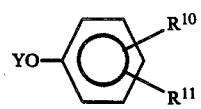
(7)

wherein $R^{10}$ is OH or

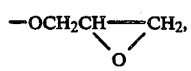

$R^{11}$ is H, OH, alkyl group having 1 to 4 carbon atoms or

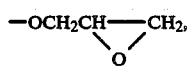

Y is perfluoroalkenyl group having 6 to 14 carbon atoms.

In the above, examples of fluorine-containing monovalent organic group X are perfluoroalkenyloxy group having 6 to 14 carbon atoms or fluoroalkyl group having 2 to 20 carbon atoms.

Examples of the former perfluoroalkenyloxy groups are the following groups of formulae

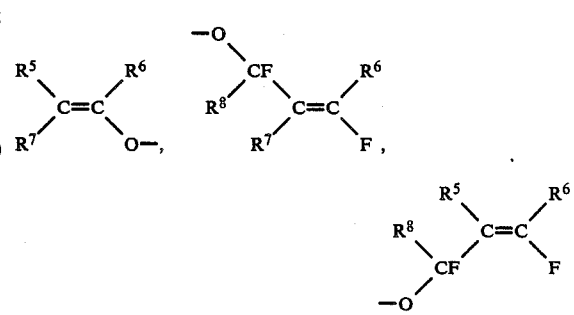

wherein $R^5$, $R^6$ and $R^7$ are each perfluoroalkyl group having 1 to 6 carbon atoms, or one of them is fluorine atom and the others are each perfluoroalkyl group having 1 to 6 carbon atoms, $R^8$ is perfluoroalkyl group having 1 to 5 carbon atoms. Especially preferable are groups formed by eliminating one fluorine atom from a dimer or trimer of hexafluoropropene, or tetramer, pentamer, hexamer or heptamer of tetrafluoroethylene, and bonding thereto one oxygen atom. These groups are shown below by the formulae:

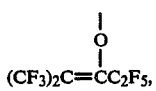

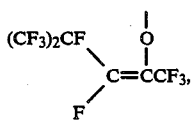

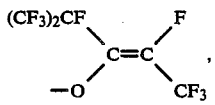

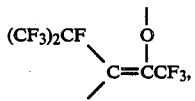

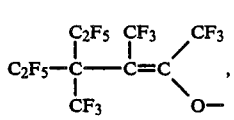

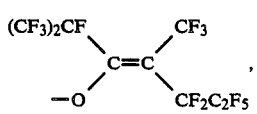

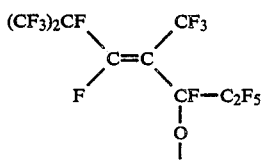

The latter fluoroalkyl groups include those represented by the formulae $CF_3(CF_2)_n(CH_2)_m-$ $(CF_3)_2CF(CF_2)_k(CH_2)_m-$ $CF_3(CF_2)_kCF(CF_3)(CH_2)_m-$ $R^9(CF_2)_n(CH_2)_m-$ wherein $R^9$ is hydrogen atom, Cl or Br, k is 0 to 17, m is 0 to 4, n is 1 to 19.

The present fluorine-containing novolak resin and its derivative are prepared, for example, by subjecting to addition-condensation reaction in the presence of an acid, formaldehyde (FA) and phenol derivative of the formula

    (2)

wherein $R^2$ and X are the same as above. Formalin and paraformaldehyde can also be used for FA. The compound (2) is used preferably in an amount of about 0.1 to 10 moles per mole of FA. It is possible to use other phenols such as trifluoromethylphenol conjointly with the compound (2) to prepare a co-addition-condensation product. The acid is suitably selected from those which are known in the preparation of novolak resin from addition-condensation reaction of phenols and FA. Examples of acids are hydrochloric acid, sulfuric acid, phosphoric acid, oxalic acid, formic acid, acetic acid and trifluoroacetic acid. The acid is used preferably in such an amount as to render the pH of the reaction system below 4. The reaction is conducted preferably at about 50° to 200° C. and the reaction time and reaction pressure are not particularly limited.

The present fluorine-containing novolak resin and its derivative are also prepared for example by reacting a perfluoroalkene YF with novolak resin of the formula

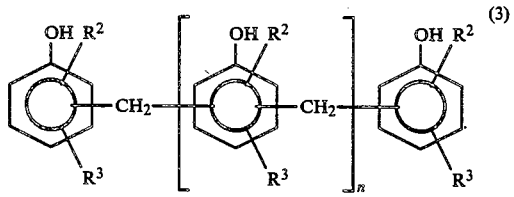    (3)

wherein $R^2$ is the same as above, $R^3$ is hydrogen atom or OH.

In the above, examples of perfluoroalkenyl group Y having 6 to 14 carbon atoms are the following groups of the formulae

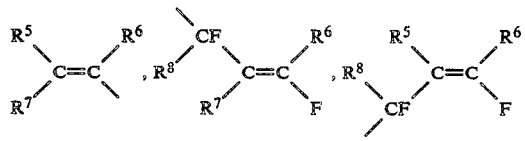

wherein $R^5$, $R^6$ and $R^7$ are each perfluoroalkyl group having 1 to 6 carbon atoms, or one of them is fluorine atom and the others are each perfluoroalkyl group having 1 to 6 carbon atoms, $R^8$ is perfluoroalkyl group having 1 to 5 carbon atoms. Especially preferable are groups formed by eliminating one fluorine atom from a dimer or trimer of hexafluoropropene, or tetramer, pentamer, hexamer or heptamer of tetrafluoroethylene. Examples of these groups are shown below by the formulae.

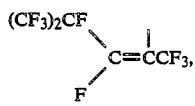

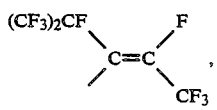

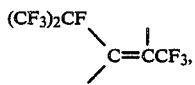

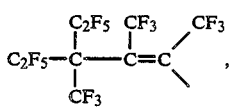

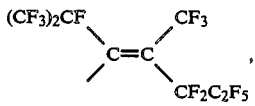

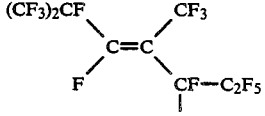

Examples of perfluoroalkenes YF are the following compounds of the formula

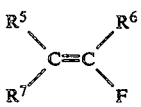    (4)

wherein $R^5$, $R^6$ and $R^7$ are the same as above. Especially preferable are a dimer or trimer of hexafluoropropene, or tetramer, pentamer, hexamer or heptamer of tetrafluoroethylene. Examples thereof are shown below by the formulae.

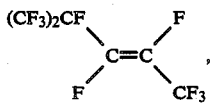

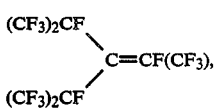

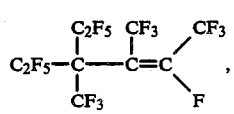

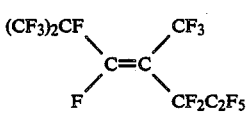

The above pefluoroalkenyloxylation reaction is conducted preferably in a solvent in the presence of a base. Examples of bases are triethylamine, trimethylamine, tripropylamine or like amines and alkali metal or hydroxides thereof. As a solvent is used preferably an aprotic polar solvent such as acetonitrile, dimethyl formamide or dimethyl sulfoxide. The perfluoroalkene is used preferably in an amount of about 0.01 to 0.95 mole per equivalent of the resin (3). The reaction temperature is suitably selected but is preferably selected from the range of about 0° to 40° C. The base is used preferably in an amount of about 1 to 20 moles per equivalent of the resin (3).

The compounds YF of the formula (4) include compounds represented by the formulae below.

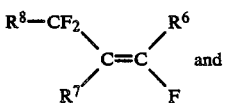

From the above compounds, the following groups are produced respectively.

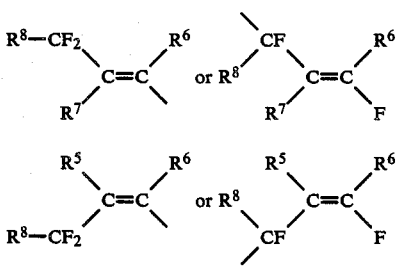

More specifically, from the compound

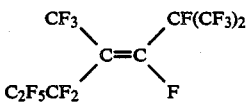

the following group is formed.

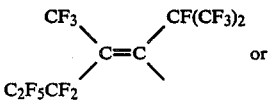

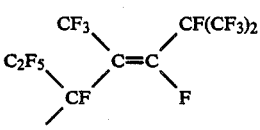

Further, the present fluorine-containing novolak resin and its derivative are prepared for example by reacting the novolak resin (3) with a compound of the formula $$Z-\underset{Ar}{I}-OSO_2A \qquad (5)$$

In the above, Z, is fluoroalkyl group having 2 to 20 carbon atoms and includes $CF_3(CF_2)n(CH_2)m-$ $(CF_3)_2CF(CF_2)k(CH_2)m-$ $CF_3(CF_2)kCF(CF_3)(CH_2)m-$ $R^9(CF_2)n(CH_2)m-$ wherein $R^9$ is hydrogen atom, Cl or Br, k is 0 or an integer of 1 to 17, m is 0 or an integer of 1 to 4, n is an integer of 1 to 19. Ar is substituted or unsubstituted phenyl group and the substituents include F, Cl, Br and $C_{1\sim 10}$ alkyl. A is $C_{1\sim 10}$ alkyl, $C_{1\sim 10}$ haloalkyl, halogen atom, hydroxyl or aryl group. Halogen atoms include F, Cl and Br. Aryl groups include phenyl, tolyl and naphthyl. The compound (5) can be prepared by methods disclosed for example in Japanese unexamined patent publication Nos. 24319/1982, 172959/1985 and 24529/1986.

The above fluoroalkylation reaction is conducted preferably in a solvent in the presence of a base. Examples of bases are alkali carbonates, alkali hydrogencarbonates, pyridine unsubstituted or substituted with $C_{1\sim 10}$ alkyl group, etc. The solvent includes acetonitrile, dichloromethane, chloroform, carbon tetrachloride, dimethyl formamide and dimethyl acetamide. The compound (5) is used in an amount of preferably about 0.01 to 10 equivalents per equivalent of benzene ring of the resin (3). The reaction temperature is suitably selected but is preferably in the range of about −20° C. to +150° C. The base is used in an amount of preferably about 1 to 10 equivalents per equivalent of the compound (5). The reaction time is not particularly limited and is usually about 5 minutes to 10 hours. The reaction pressure is not limited particularly. The reaction product can be isolated and purified by a method such as concentration, precipitation and column chromatography.

The fluorine-containing novolak resin (1) wherein $R^1$ is

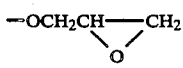

(hereinafter referred to as "O-Gly") is prepared by subjecting to etherification reaction epichlorohydrin (hereinafter referred to as "ECH") and a derivative comprising a repeating unit of the formula

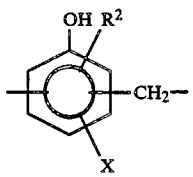

wherein $R^2$ and X are the same as above. The solvent is not necessarily used but methyl ethyl ketone (MEK), methyl isobutyl ketone (MIBK) and like ketones can be used. ECH is used in an amount of preferably about 1 to 50 moles per equivalent of hydroxyl group of the derivative comprising the unit (6). Alkali such as NaOH, KOH, LiOH and $Ca(OH)_2$ is used preferably in an amount of about 1 to 10 equivalents per equivalent of hydroxy group of the derivative comprising the unit (6). The catalyst is not necessarily used but it is possible to use trimethylbenzylammonium chloride, tetramethylammonium bromide or like quaternary ammonium salt in an amount of about 0.01 to 10% by weight in the reaction system. The reaction temperature is suitably selected but is preferably in the range of about 20° to 200° C. The reaction time and reaction pressure are not limited particularly.

In the following are described the perfluoroalkenyloxyphenol and its derivative of the formula (7), which are one of the starting materials of the above fluorine-containing novolak resin and its derivative of the formula (1).

In the compound (7), perfluoroalkenyloxyphenols wherein $R^{10}$ is OH, $R^{11}$ is H or alkyl group having 1 to 4 carbon atoms are prepared for example according to the following equation.

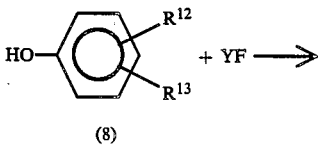

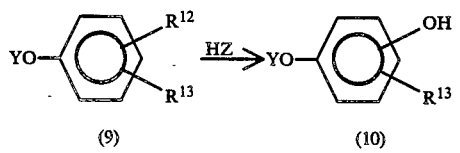

In the above, monoalkoxy- (or monoacyloxy-)phenol or its alkyl derivative (8) is reacted with perfluoroalkene YF to obtain perfluoroalkenyloxy-monoalkoxy- (or monoacyloxy-)benzene or its alkyl derivative (9), and the compound (9) is reacted with hydrogen halide HZ to obtain perfluoroalkenyloxyphenol or its alkyl derivative (10). $R^{13}$ is H or alkyl group of 1 to 4 carbon atoms, $R^{12}$ is alkoxy group of 1 to 8 carbon atoms or acyloxy group of 1 to 8 carbon atoms.

Similarly, perfluoroalkenyloxy-hydroxyphenol, the compound (7) in which $R^{10}$ and $R^{11}$ are respectively OH, is obtained for example by the following equation.

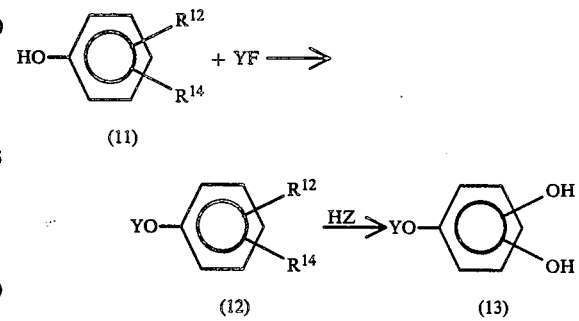

$R^{12}$ and $R^{14}$ are respectively alkoxy group of 1 to 8 carbon atoms or acyloxy group of 1 to 8 carbon atoms, and the reaction is conducted in the same manner as above.

In the above, as the perfluoroalkene YF, the same compound is used as above.

Examples of hydrogen halides HZ are hydroiodic acid and hydrobromic acid.

The above perfluoroalkenyloxylation reaction preparing the compound (9) or (12) from the compound (8) or (11) respectively is conducted preferably in a solvent in the presence of a base. Examples of bases are triethylamine, trimethylamine, tripropylamine or like amines and alkali metal or hydroxides thereof. As a solvent is used preferably an aprotic polar solvent such as acetonitrile, dimethyl formamide or dimethyl sulfoxide. The perfluoroalkene is used preferably in an amount of about 1 to 10 moles per mole of the compound (8) or (11). The reaction temperature is suitably selected but is preferably selected from the range of about 0° to 40° C., more preferably about 0° to 20° C. The base is used preferably in an amount of about 1 to 20 moles per mole of the compound (8) or (11). The desired compound (9) or (12) can be isolated and recovered by a known method such as distillation and recrystallization used for separation of ordinary organic compound mixture, and can be used in the next process with or without purification.

Dealkylation (or deacylation) reaction of the above compound (6) or (12) in the presence of hydrogen halide is conducted preferably in the presence of a solvent. The solvent includes formic acid, acetic acid, trifluoroacetic acid, methanol, ethanol, n-propanol, isopropanol and n-butanol. Hydrogen halide is used preferably in an amount of about 2 to 100 moles per mole of the compound (9) or (12). The reaction temperature is suitably selected but is preferably in the range of about 50° to 200° C. Dealkylation (deacylation) reaction can also be conducted with use of aluminum chloride and like Lewis acid. The desired compound (10) or (13) can be isolated and purified by a usual method such as extraction, concentration, distillation and recrystallization.

Further, among the above reactions, deacylation reaction can also be carried out by saponifying the acylated compound with use of alkali metal hydroxide and/or alkaline earth metal hydroxide in a medium such as water, methanol, ethanol and like alcohol and then acidifying the reaction system. It is preferable to use about 2 to 30 moles of alkali metal hydroxide and/or alkaline earth metal hydroxide per mole of the compound (9) or (12). The reaction temperature is suitably selected but is preferably in the range of about 20° to 100° C.

Perfluoroalkenyloxyphenyl glycidyl ethers, the compound (7) in which $R^{10}$

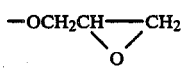

(hereinafter referred to as "O-Gly"), $R^{11}$ is hydrogen or alkyl group of 1 to 4 carbon atoms, is prepared by etherification of the compound (10) and epichlorohydrin (hereinafter referred to as "ECH"). Further, perfluoroalkenyloxyphenyl diglycidyl ether, the compound (7) in which $R^{10}$ and $R^{11}$ are both O-Gly, is obtained by etherification of the compound (13) and ECH. The solvent is not necessarily used in the reaction but methyl ethyl ketone (MEK), methyl isobutyl ketone (MI BK) and the like can be used. ECH is used preferably in an amount of about 2 to 100 moles per mole of the compound (10) or (13). Alkali compound such as NaOH, KOH, LiOH and Ca(OH)$_2$ is used preferably in amount of about 1 to 20 equivalents per equivalent of OH of the compound (10) or (13). The catalyst is not necessarily used but trimethylbenzylammonium chloride, tetramethylammonium bromide and like quaternary ammonium salt can be used in an amount of about 0.01 to 10% by weight based on the reaction system. The reaction temperature can be suitably selected but is preferably in the range of about 50° to 200° C. The desired perfluoroalkenyloxyphenyl mono (or di)glycidyl ether can be isolated or purified by a usual method such as extraction, concentration, distillation and re-crystallization.

Among the present compounds, perfluoroalkenyloxyphenol is reacted with formaldehyde similarly to phenol to form novolak or resol resin which cures by heat or with addition of a hardener such as hexamethylenetetramine. The cured product is excellent in resistance to heat and water, and can be used as electric materials such as an insulating plate. Perfluoroalkenyloxyphenyl glycidyl ether polymerizes similarly to an epoxy compound with addition of a curing catalyst or hardener such as Lewis acid, tertiary amine, imidazole, acid anhydride and polyamine to form a cured product. The cured product is excellent in resistance to heat and water, and can be used as electric materials such as an insulating plate.

The fluorine-containing novolak resin and its derivative of the present invention are excellent in resistance to water and heat and are useful as a hardener for an epoxy resin or fluorine-containing epoxy resin. For example, the present resin is widely used as a packaging material for semiconductor element, resin for preparing a printed circuit board, various electrically insulating material, adhesive, etc.

The present invention is explained below in detail by showing Reference Examples, Examples and Test Example.

EXAMPLE 1

To a reaction vessel equipped with a stirrer, dropping funnel and thermometer were added 130 g of p-methoxyphenol, 900 ml of dimethyl formamide and 318 g of triethylamine and the mixture was cooled below 20° C. Thereto added dropwise 450 g of hexafluoropropene trimer for a period of 10 minutes while maintaining the temperature below 20° C. and the mixture was stirred at the same temperature for 2 hours. After completion of the reaction, the reaction mixture was poured into a large amount of dil.-hydrochloric acid and the precipitated yellow oil was recovered. The oil was washed with water repeatedly until the aqueous layer does not indicate acidity. The resulting oil was distilled to obtain 443 g of 4-perfluorononenyloxyphenyl methyl ether having a boiling point of 86° to 87° C./4 mmHg.

In 1300 ml of acetic acid was dissolved 388 g of the ether and thereto added 1300 ml of 57% aqueous solution of hydroiodic acid. The mixture was refluxed with heat and stirring for 24 hours. After allowed to cool, the liquid product was added to 5% aqueous solution of sodium sulfite and the mixture was extracted twice with 2 l of chloroform. The chloroform solution was concentrated to obtain crude crystals which were dissolved in chloroform and recrystallized, thereby 311 g of 4-perfluorononenyloxyphenol [Compound (A)] having a melting point of 105° C. was obtained.

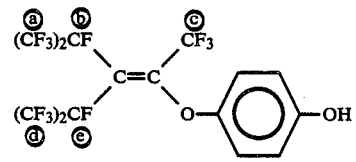

$^{19}$F—NMR
(external standard CF$_3$COOH, in CDCl$_3$, δppm)
Chemical shift (δppm) is shown in which high magnetic field is indicated by a plus value (same as hereinafter).
ⓐ −5.1, 6F
ⓑ −6.4 6F
ⓒ −21.4, 3F
ⓓ 89.2, 1F
ⓔ 91.4, 1F

EXAMPLE 2

3-Perfluorononenyloxyphenyl methyl ether (423 g) was obtained in the same manner as in Example 1 except that m-methoxyphenol was used in place of p-methoxyphenol. Boiling point was 83° to 86° C./4 mmHg.

In 1300 ml of acetic acid was dissolved 388 g of the ether and thereto added 1300 ml of 57% aqueous solution of hydroiodic acid. The mixture was refluxed with heat and stirring for 57 hours. After allowed to cool, the reaction liquid was added to 5% aqueous solution of sodium sulfite and the mixture was extracted twice with 2 l of chloroform. The residue obtained by removing chloroform at a reduced pressure was distilled to obtain 282 g of 3-perfluorononenyloxyphenol [Compound (B)] having a boiling point of 94° to 96° C./4 mmHg.

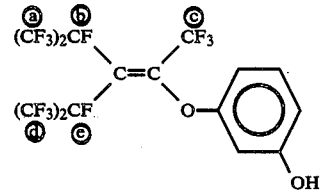

$^{19}$F—NMR
(external standard CF$_3$COOH, in CDCl$_3$, δppm)

ⓐ −5.2, 6F
ⓑ −6.5, 6F
ⓒ −21.3, 3F
ⓓ 89.4, 1F
ⓔ 91.3, 1F

EXAMPLE 3

3-Perfluorononenyloxyphenyl methyl ether (235 g) was obtained in the same manner as in Example 2 except that 300 g of hexafluoropropene dimer was used in place of hexafluoropropene trimer.

In 1300 ml of acetic acid was dissolved 283 g of the ether and thereto added 1300 ml of 57% aqueous solution of hydroiodic acid. The mixture was refluxed with heat and stirring for 60 hours. After allowed to cool, the reaction liquid was added to 5% aqueous solution of sodium sulfite and the mixture was extracted with 2 of chloroform. The residue obtained by removing chloroform at a reduced pressure was distilled to obtain 139 g of 3-perfluorohexenyloxyphenol [Compound (C)] having a boiling point of 83° to 84° C./4 mmHg.

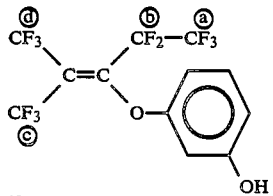

$^{19}$F—NMR
(external standard CF$_3$COOH, in CDCl$_3$, δppm)
ⓐ 4.1, 3F
ⓑ 35.1, 2F
ⓒ −18.0, 3F
ⓓ −21.4, 3F

EXAMPLE 4

In 190 ml of dimethylformamide is dissolved 30.8 g of 3,5-dimethoxyphenol and thereto added 60.6 g of triethylamine. To the mixture was added dropwise 85 g of hexafluoropropene trimer over a period of 10 minutes while maintaining the mixture below 20° C. After stirring for 4 hours, the reaction liquid is poured into dil.-HCl. The resulting oily precipitates were collected and recrystallized from chloroform to obtain 71 g of 1-perfluorononenyloxy-3,5-dimethoxybenzene.

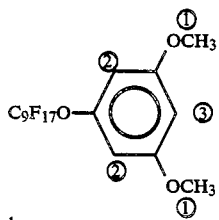

$^1$H—NMR
(in CDCl$_3$, TMS standard, δppm)
① 3.8, s, 6H
② 6.0, s, 2H
③ 6.2, s, 1H A mixture of 70 g of the above compound, 300 ml of acetic acid and 300 ml of 57% hydroiodic acid was refluxed with heating for 60 hours. After allowed to cool, the reaction liquid was poured into 5% aqueous solution of sodium sulfite and extracted twice with 500 ml of chloroform. The residue obtained by removing chloroform at a reduced pressure was recrystallized from chloroform to give 34 g of 5-perfluorononenyloxybenzene-1,3-diol.

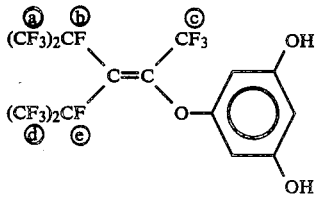

$^{19}$F—NMR
(external standard CF$_3$COOH, in CDCl$_3$, δppm)
ⓐ −6.1, 6F
ⓑ −7.4, 6F
ⓒ −22.3, 3F
ⓓ 88.7, 1F
ⓔ 90.5, 1F

EXAMPLE 5

In 100 ml of dimethylformamide was dissolved 22.5 g of resorcin monobenzoate and thereto added 32 g of triethylamine, and the mixture was cooled below 20° C. Thereto was added dropwise hexafluoropropene trimer over a period of 10 minutes and the mixture was stirred for 3 hours while maintaining the mixture below 20° C. The reaction liquid was poured into dil.-HCl and the resulting precipitates were collected, washed with water and dried. The obtained crude product was recrystallized from chloroform to give 62 g of 3-perfluorononenyloxyphenyl benzoate.

A mixture of 60 g of the above compound, 100 ml of methanol, 4.7 g of sodium hydroxide and 40 ml of water was refluxed with heating and stirring. After 2 hours, when HCl was added to the reaction liquid to render the liquid acidic, the liquid separated into two layers. The upper layer was extracted with chloroform and the extract was united with the lower layer. The mixture was washed with water until the mixture does not indicate acidity. After removing chloroform, the residue was distilled at a reduced pressure to give 29 g of 1-perfluorononenyloxy-3-hydroxybenzene. The compound is coincident with that obtained in Example 2 in boiling point and $^{19}$F-NMR.

EXAMPLE 6

In 37 g of epichlorohydrin was dissolved with heating 10.8 g of 4-perfluorononenyloxyphenol and thereto added 0.2 g of water. To the mixture was gradually added 1.1 g of finely divided sodium hydroxide with heating and stirring. The mixture was refluxed with heating and stirring for 40 hours. After completion of the reaction, 200 ml of toluene was added thereto and the resulting sodium chloride was removed by filtration. The filtrate was washed with water repeatedly until the aqueous layer does not indicate alkalinity. The toluene solution was dried over anhydrous sodium sulfate and toluene and epichlorohydrin were removed at a reduced pressure. The residue was distilled at a reduced pressure to obtain 6.2 g of 4-perfluorononenyloxyphenol glycidyl ether having a boiling point of 135° to 136° C./5 mmHg.

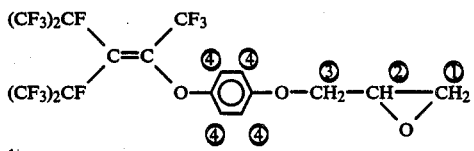

¹H—NMR
(in CCl₄, TMS standard, δppm)
① 2.6, m, 2H
② 3.2, m, 1H
③ 3.8, m, 2H
④ 6.8, s, 4H

REFERENCE EXAMPLE 1

A mixture of 80 g of di(trifluoroacetoxy)iodo-n-tridecafluorohexane [CF₃(CF₂)₅I(OCOCF₃)₂], 250 ml of trichlorotrifluoroethane, 14.9 ml of benzene and 13.7 ml of trifluoromethanesulfonic acid was stirred at 0° C. for 3 hours. The reaction was continued by stirring the mixture at room temperature for further 20 hours. After completion of the reaction, the solvent was removed at a reduced pressure. The residue was recrystallized repeatedly from a solvent mixture of chloroform and acetonitrile (volume ratio=11/1) to obtain 44 g of white crystal which is n-tridecafluorohexylphenyliodonium methanesulfonate [Compound (D)].

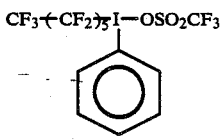

¹⁹F—NMR
(external standard CF₃COOH, in CDCl₃, δppm)
−5.8, 2F (—C$F_2$—I—)
1.0 3F (CF₃SO₃—)
3.6 3F [C$F_3$(CF₂)₅]
36.3, 43.8, 45.0, 48.5,
2F × 4[CF₃(C$F_2$)₄CF₂—I—]

EXAMPLE 7

To 100 ml of 80% sulfuric acid were added 108 g of Compound (A) and 11.1 g of paraformaldehyde and the mixture was gradually heated with stirring and maintained at about 100° C. for 1.5 hours. After completion of the reaction, the mixture was allowed to stand and the separated sulfuric acid layer was removed. The resulting resineous product was dissolved in chloroform and washed with water repeatedly until the chloroform layer does not indicate acidity. The chloroform soultion was dried over anhydrous magnesium sulfate and then concentrated. The residue was added dropwise to a large amount of petroleum benzin and the resulting precipitate was allowed to stand at room temperature for 12 hours. The precipitated resineous product was collected and petroleum benzin was removed at 60° C. at a reduced pressure to obtain 58 g of yellowish brown solid.

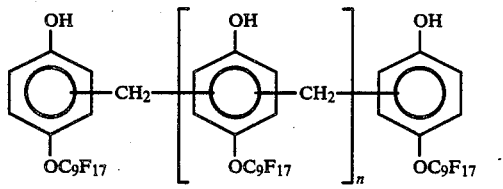

An average polymerization degree (n) was calculated from the following equation using a ratio (γ) of integrated value of phenyl proton signal (I Ph-H) to integrated value of methylene proton signal (I-CH₂—) in ¹H-NMR.

$$\gamma = \frac{I Ph-H}{I-CH_2-} = \frac{2n+6}{2n+2}$$

¹H-NMR (in acetone-d₆, TMS standard, δ ppm):

| 4.05 | 2.6H | (—CH₂—) |
|---|---|---|
| 6.7~7.0 | 4.9H | (phenyl—H) |
| γ = 1.88, | n = 1.3 | |

EXAMPLE 8

To 200 ml of 80% sulfuric acid were added 216 g of Compound (B) and 22.2 g of paraformaldehyde and the mixture was heated with stirring from room temperature to 110° C. over a period of about 20 minutes and stirred at the same temperature for further 20 minutes. After completion of the reaction, the mixture was allowed to stand and the separated sulfuric acid layer was removed. The resulting resineous product ws dissolved in trichlorotrifluoroethane and washed with water repeatedly until the trichlorotrifluoroethane layer does not indicate acidity. The trichlorotrifluoroethane solution was dried over anhydrous magnesium sulfate and then added dropwise to a large amount of petroleum benzin and the resulting precipitate was filtered. The filtrate was concentrated and the obtained precipitates were collected and dissolved in trichlorotrifluoroethane. The solution was poured into petroleum benzin and the resulting precipitates were united with the above precipitates. The solvent was removed therefrom at a reduced pressure to obtain 139 g of brown solid.

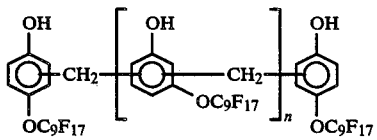

An average polymerization degree (n) was caluculated in the same manner as in Example 7.

¹H-NMR (in acetone-d₆, TMS standard, δ ppm):

| 4.0 | 3.2H | (—CH₂—) |
|---|---|---|
| 6.2~7.2 | 4.9H | (phenyl—H) |
| n = 2.8 | | |

EXAMPLE 9

A novolak resin (98 g) having an average polymerization degree (n) of 3.8 was obtained in the same manner as in Example 8 except that 156 g of Compound (C) was used in place of Compound (B).

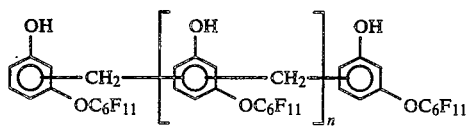

$^1$H-NMR (in acetone-d$_6$, TMS standard, δ ppm):

| 4.0 | 2.4H | (—CH$_2$—) |
|---|---|---|
| 6.2~7.3 | 3.4H | (phenyl—H) |

EXAMPLE 10

To 300 ml of 80% sulfuric acid were added 162 g of Compound (A), 48.6 g of n-trifluoromethylphenol and 33.5 g of paraformaldehyde and the mixture was heated with stirring from room temperature to 100° C. over a period of 10 minutes and maintained at the same temperature for further 15 minutes. After completion of the reaction, the product obtained by removing sulfuric acid layer was dissolved in acetone and the solution was added dropwise to a large amount of water. The precipitates were collected and washed with water repeatedly until the water does not indicate acidity and then dried at 60° C. at a reduced pressure. The residue was dissolved in trichlorotrifluoroethane and the solution was added dropwise to a large amount of petroleum benzin. The resulting precipitates were collected and petroleum benzin was removed at a reduced pressure to obtain 170 g of brown solid.

The product had a number average molecular weight ($\overline{Mn}$) of 1640 and a weight average molecular weight ($\overline{Mw}$) of 2350 in term of polystyrene by gel permeation chromatography.

$^{19}$F-NMR (external standard CF$_3$COOH, in acetone-d$_6$, δ-ppm). Chemical shift (δ ppm) is shown in which high magnetic field is indicated by a plus value (same as hereinafter).

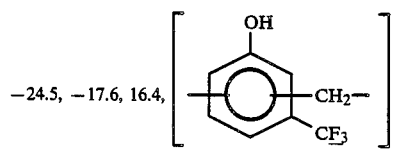

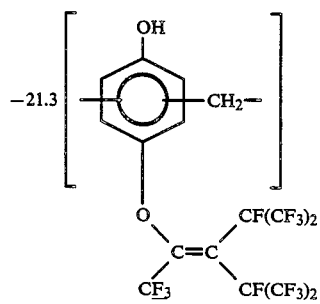

$$\frac{\text{Integrated value of signal ①}}{\text{Integrated value of signal ②}} = 1.10$$

Accordingly, a co-addition-condensation product was obtained which has a molar weight of 1:0.91 of the following two components.

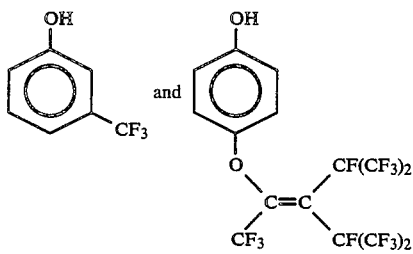

EXAMPLE 11

A homogeneous solution of 159 g of phenol novolak resin [Sumitomo Bakelite Corp., PR-53194], 1200 ml of dimethylformamide and 137 g of triethylamine was cooled to about 10° C. To the solution was added dropwise 203 g of hexafluoropropene trimer with stirring for 10 minutes while maintaining the same temperature. After stirring for 3 hours, the reaction liquid was poured into a large amount f dil.-hydrochloric acid and the resulting precipitates were filtered and washed with water. The precipitates were dried at 60° C. at a reduced pressure and then dissolved in 1000 ml of acetone and filtered. The filtrate was concentrated and the solvent was removed at 110° C. for 10 hours at a reduced pressure to obtain 289 g of light brown solid having fluorine content of 38.3%.

EXAMPLE 12

A mixture of 110 g (1 mole) of resorcinol and 64.4 g of 35% formalin was cooled below 20° C. and thereto added 0.05 ml of 3.6% HCl with stirring. After 5 minutes, 0.5 ml of 3.6% HCl was further added. The temperature increased to 30° C. After 10 minutes, 0.1 ml of 3.6% HCl was added and 0.2 ml of 3.6% HCl was added three times every 5 minutes later while cooling the mixture below 55° C. Then, the mixture was heated to 92° C. over a period of 20 minutes and further refluxed with heating for 3 hours. After completion of the reaction, the reaction liquid was poured into a large amount of water and the resulting precipitates were collected, dissolved in acetone and reprecipitated in water. The resulting preciitates were dried at 105° C. for 12 hours at a reduced pressure to obtain 48 g of resorcinol novolak resin. The resin had a number average molecular weight ($\overline{Mn}$) of 1300 and a weight average molecular weight ($\overline{Mw}$) of 1900 in term of polystyrene by gel permeation chromatography.

To a solution of 36.6 g of the resorcinol novolak resin in 250 ml of dimethylformamide was added 27.3 g of triethylamine. To the solution was added dropwise 40.5 g of hexafluoropropene trimer over a period of 10 minutes while maintaining the solution at 6° to 10° C. The mixture was stirred for 4 hours while maintaining the temperature below 10° C. After completion of the reaction, the reaction liquid was poured into a large amount of dil.-HCl to precipitate fluorine-containing resorcinol novolak resin. The precipitates were dissolved in acetone and reprecipitated in water. The precipitates were filtered and dried at 105° C. at a reduced pressure to obtain 64 g of the resin. F content 39.1%

$^{19}$F-NMR (external standard CF$_3$COOH, in acetone-d$_6$, δ-ppm),

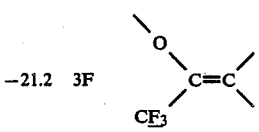

−21.2  3F $^1$H-NMR (in acetone-d$_6$, TMS standard, δ ppm):

| 3.8 | br (—CH$_2$—) |
| 6.2~7.4 | br (phenyl—H) |

EXAMPLE 13

In 150 ml of epichlorohydrin was dissolved 30 g of fluorine-containing resorcinol novolak resin of Example 12. To the solution was gradually added 8.2 g of finely pulverized sodium hydroxide with stirring and the mixture was refluxed with heating. After reacted for 10 hours, the reaction mixture was cooled to room temperature and thereto added 200 ml of chloroform. The filtrate obtained by removing sodium chloride by filtration was washed with water. The organic layer was concentrated at a reduced pressure and the obtained viscous liquid was poured into a polytetrafluoroethylene tray. The solvent was removed at 105° to 110° C. for 24 hours at a reduced pressure to obtain fluorine-containing novolak epoxy resin which was 219 in epoxy equivalent as measured by HCl-dioxane method.

EXAMPLE 14

In 150 ml of acetonitrile was dissolved 3.2 g of phenol novolak resin [Sumitomo Bakelite Corp., PR-53194]. To the solution were added 2.6 ml of pyridine and 21.2 g of Compound (D) and the mixture was reacted at 60° C. for 1 hour. The residue obtained by removing the solvent at a reduced pressure was dissolved in acetone and the solution was poured into water to obtain precipitates. The precipitates were dried and dissolved in trichlorotrifluoroethane. The solution was poured into a large amount of petroleum benzin and the resulting precipitates were collected. The solvent was removed at 110° C. for 13 hours at a reduced pressure to obtain 4.6 g of brown solid having fluorine content of 51.2%.

TEST EXAMPLE 1

In 100 ml of methyl isobutyl ketone were dissolved 29 g of fluorine-containing phenol novolak resin of Example 11 and 22 g of fluorine-containing resorcinol novolak epoxy resin of Example 13. To the solution was added 0.2 g of boron trifluoride-piperidine complex and mixed homogeneously. The mixture was poured into a polytetrafluoroethylene Petri dish and the solvent was removed at 80° C. at a reduced pressure. After foaming was disappeared, the dish was heated in an oven at 120° C.×5 hr, 150° C.×12 hr and 180° C.×2 hr to obtain a cured product having a thickness of about 3 mm.

COMPARISON EXAMPLE 1

In 100 ml of methyl isobutyl ketone were dissolved 20 g of phenol novolak resin [Sumitomo Bakelite Corp., PR-53194] and 40 g of o-cresol novolak epoxy resin. To the solution was added 0.4 g of boron trifluoride-piperidine complex and mixed homogeneously. A cured product was prepared in the same manner as in Test Example 1.

The cured products were checked for water absorbency after boiling in water and weight loss commencing temperature according to JIS K-6911. The results were shown in Table 1.

TABLE 1

| | Test Ex. 1 | Com. Ex. 1 |
|---|---|---|
| Water absorbency (%) | 0.04 | 0.38 |
| Weight loss commencing temperature (°C.) | 287 | 275 |

We claim:

1. Fluorine-containing novolak resin or its derivative having a repeating unit of the formula

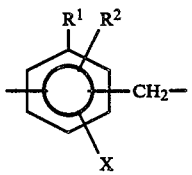

(1)

wherein R$^1$ is a hydrogen atom or

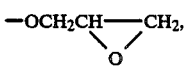

R$^2$ is a hydrogen atom or alkyl group having 1 to 4 carbon atoms, X is a fluorine-containing monovalent organic group having 2 to 20 carbon atoms.

2. Fluorine-containing novolak resin or its derivative as defined in claim 1 wherein X is a perfluoroalkenyloxy group.

3. Fluorine-containing novolak resin or its derivative as defined in claim 1 wherein X is a fluoroalkyl group.

4. Fluorine-containing novolak resin or its derivative as defined in claim 1 wherein at least one percent by weight of the repeating unit (1) is contained in the novolak resin or its derivative.

5. A process for preparing the fluorine-containing novolak resin or its derivative of claim 1 which comprises subjecting to addition-condensation reaction in the presence of an acid, formaldehyde and phenol derivative of the formula

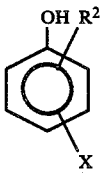

(2)

wherein R$^2$ and X are the same as above.

6. A process for preparing the fluorine-containing novolak resin or its derivative of claim 1 which comprises reacting a perfluoroalkene with novolak resin of the formula

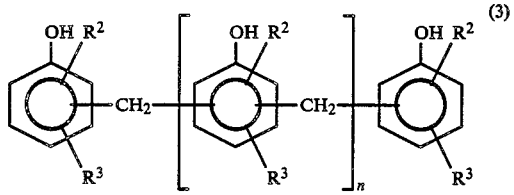 (3)

wherein $R^2$ is the same as above, $R^3$ is a hydrogen atom or OH.

7. A process for preparing the fluorine-containing novolak resin or its derivative of claim 1 which comprises reacting the novolak resin (3) with a compound of the formula

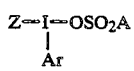 (5)

wherein Z is a fluoroalkyl group having 2 to 20 carbon atoms, Ar is a substituted or unsubstituted phenyl group, A is a $C_{1\sim10}$ alkyl, $C_{1\sim10}$ haloalkyl, halogen atom, hydroxyl or aryl group.

8. A process for preparing the fluorine-containing novolak resin or its derivative of claim 1 which comprises subjecting to etherification reaction epichlorohydrin and a derivative (6) containing a repeating unit of the formula

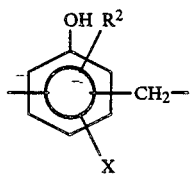 (6)

wherein $R^2$ and X are the same as above.

9. Perfluoroalkenyloxyphenol or its derivative of the formula

 (7)

wherein $R^{10}$ is a OH or

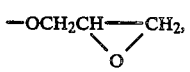

$R^{11}$ is a H, OH, alkyl group having 1 to 4 carbon atoms or

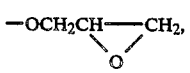

Y is a perfluoroalkenyl group having 6 to 14 carbon atoms.

10. A process for preparing the perfluoroalkenyloxyphenol or its derivative of claim 9 wherein $R^{10}$ is OH, $R^{11}$ is H or alkyl group having 1 to 4 carbon atoms, which comprises reacting the compound of the formula (8) with perfluoroalkene YF and reacting the resulting compound (9) with hydrogen halide HZ

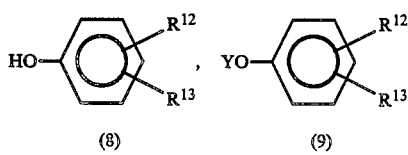

wherein $R^{12}$ is alkoxy group of 1 to 8 carbon atoms or acyloxy group of 1 to 8 carbon atoms, $R^{13}$ is H or alkyl group of 1 to 4 carbon atoms.

11. A process for preparing the perfluoroalkenyloxyphenol or its derivative of claim 9 wherein $R^{10}$ and $R^{11}$ are OH respectively, which comprises reacting the compound of the formula (11) with perfluoroalkene YF and reacting the resulting compound (12) with hydrogen halide HZ

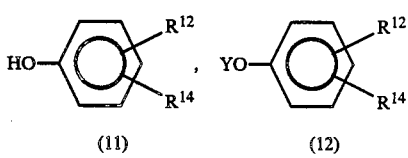

wherein $R^{12}$ and $R^{14}$ are respectively alkoxyl group of 1 to 8 carbon atoms or acyloxy group of 1 to 8 carbon atoms.

12. A process for preparing the perfluoroalkenyloxyphenol or its derivative of claim 9 wherein $R^{10}$ is

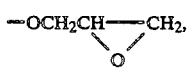

$R^{11}$ is hydrogen or alkyl group of 1 to 4 carbon atoms, which comprises etherification of the compound (10) and epichlorohydrin

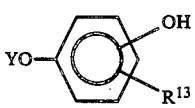 (10)

wherein $R^{13}$ and Y are the same as above.

13. A process for preparing the perfluoroalkenyloxyphenol or its derivative of claim 9 wherein $R^{10}$ and $R^{11}$ are both

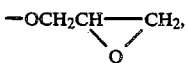

which comprises etherification of the compound (13) and epichloohydrin

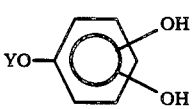 (13)

wherein Y is the same as above.

* * * * *